US011981350B2

(12) United States Patent
Choi et al.

(10) Patent No.: US 11,981,350 B2
(45) Date of Patent: May 14, 2024

(54) VEHICLE

(71) Applicants: HYUNDAI MOTOR COMPANY, Seoul (KR); KIA CORPORATION, Seoul (KR); HYUNDAI AUTOEVER CORP., Seoul (KR)

(72) Inventors: Sungwoo Choi, Seoul (KR); Seung Hwan Shin, Seoul (KR)

(73) Assignees: HYUNDAI MOTOR COMPANY, Seoul (KR); KIA CORPORATION, Seoul (KR); HYUNDAI AUTOEVER CORP., Seoul (KR)

( * ) Notice: Subject to any disclaimer, the term of this patent is extended or adjusted under 35 U.S.C. 154(b) by 147 days.

(21) Appl. No.: 17/513,088

(22) Filed: Oct. 28, 2021

(65) Prior Publication Data

US 2022/0204031 A1 Jun. 30, 2022

(30) Foreign Application Priority Data

Dec. 29, 2020 (KR) .................. 10-2020-0185903

(51) Int. Cl.
*B60W 60/00* (2020.01)
*B60W 30/095* (2012.01)
(Continued)

(52) U.S. Cl.
CPC .... *B60W 60/0011* (2020.02); *B60W 30/0956* (2013.01); *B60W 40/105* (2013.01); *B60W 40/13* (2013.01); *B60W 50/0205* (2013.01); *B60W 50/029* (2013.01); *B60W 60/0015* (2020.02); *B60W 2556/10* (2020.02)

(58) Field of Classification Search
CPC ............ B60W 30/0956; G06Q 10/047; G08G 1/0967
See application file for complete search history.

(56) References Cited

U.S. PATENT DOCUMENTS 10,679,431 B2 * 6/2020 Matos ................... H04W 48/20
2015/0344030 A1 * 12/2015 Damerow .............. G08G 1/166
701/1

(Continued)

FOREIGN PATENT DOCUMENTS

CN 208046660 U 11/2018

*Primary Examiner* — Jaime Figueroa
*Assistant Examiner* — Jerrod Irvin Davis
(74) *Attorney, Agent, or Firm* — Lempia Summerfield Katz LLC

(57) ABSTRACT

An aspect of the disclosure is to provide a vehicle capable of safely performing autonomous driving without user intervention through operations of control modules and communication between the control modules even in an emergency situation of an autonomous vehicle. The vehicle includes a plurality of control modules and a central processor. The central processor is configured to: in case of an emergency situation, determine a plurality of paths for each situation based on a speed of the vehicle; determine a risk corresponding to each of the plurality of paths for each situation based on the speed of the vehicle and a mass of the vehicle; determine a safety path corresponding to the smallest risk among the risks corresponding to each of the plurality of paths for each situation; and control the plurality of control modules based on a command set corresponding to the safety path.

6 Claims, 11 Drawing Sheets

(51) Int. Cl.
*B60W 40/105* (2012.01)
*B60W 40/13* (2012.01)
*B60W 50/02* (2012.01)
*B60W 50/029* (2012.01)

(56) References Cited

U.S. PATENT DOCUMENTS

| | | | |
|---|---|---|---|
| 2017/0162050 A1* | 6/2017 | Chen | B60W 30/08 |
| 2017/0291560 A1* | 10/2017 | Schroeder | B60T 8/92 |
| 2018/0136653 A1* | 5/2018 | Tao | G07C 5/00 |
| 2018/0261023 A1* | 9/2018 | Blayvas | G05D 1/0005 |
| 2019/0187699 A1* | 6/2019 | Salour | G05D 1/0214 |
| 2019/0243371 A1* | 8/2019 | Nister | G05D 1/0231 |
| 2021/0031760 A1* | 2/2021 | Ostafew | B60W 60/0017 |
| 2021/0179122 A1* | 6/2021 | Zhu | G05D 1/0214 |
| 2021/0358310 A1* | 11/2021 | Sachs | B64D 45/00 |

\* cited by examiner

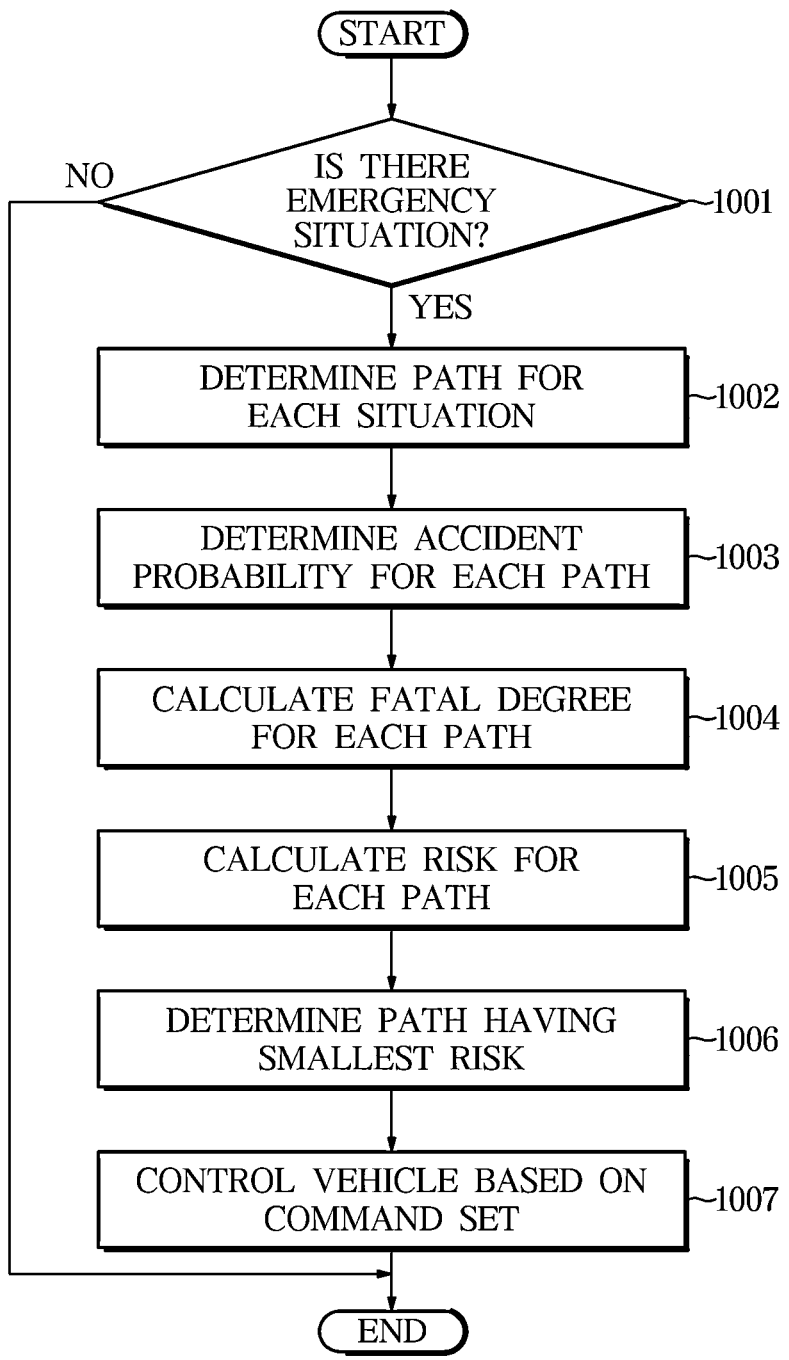

VEHICLE

CROSS-REFERENCE TO RELATED APPLICATION(S)

This application is based on and claims priority under 35 U.S.C. § 119 to Korean Patent Application No. 10-2020-0185903, filed on Dec. 29, 2020, the disclosure of which is incorporated herein by reference.

BACKGROUND

1. Field

The present disclosure relates to a vehicle performing autonomous driving.

2. Description of Related Art

An autonomous driving technology of a vehicle is a technology in which the vehicle determines a road condition and automatically drives the vehicle even if a driver does not operate a brake, a steering wheel, or an accelerator pedal.

The autonomous driving technology is a core technology for smart car implementation. For autonomous driving, the autonomous driving technology may include highway driving assist (HDA, a technology that automatically maintains a distance between vehicles), blind spot detection (BSD, a technology that detects surrounding vehicles during reversing and sounds an alarm), autonomous emergency braking (AEB, a technology that activates a braking system when the vehicle does not recognize a preceding vehicle), lane departure warning system (LDWS), lane keeping assist system (LKAS, a technology that compensates for departing the lane without turn signals), advanced smart cruise control (ASCC, a technology that maintains a constant distance between vehicles at a set speed and drives at a constant driving speed), and traffic jam assistant (TJA).

On the other hand, when a smart car switches to fully autonomous driving, the brake, the steering wheel, or the accelerator pedal that allow the driver to intervene and control the vehicle in case of an emergency will disappear due to cost issues. In this situation, there is a need for an apparatus and a method for driving the vehicle in a safe state without the driver intervention.

SUMMARY

An aspect of the disclosure is to provide a vehicle capable of safely performing autonomous driving without user intervention through operations of control modules and communication between the control modules even in an emergency situation of an autonomous vehicle.

Additional aspects of the disclosure are set forth in part in the description which follows and, in part, should be apparent from the description or may be learned by practice of the disclosure.

According to an aspect of the disclosure, a vehicle includes a plurality of control modules and a central processor. The central processor is configured to: in case of an emergency situation, determine a plurality of paths for each situation based on a speed of the vehicle; determine a risk corresponding to each of the plurality of paths for each situation based on the speed of the vehicle and a mass of the vehicle; determine a safety path corresponding to the smallest risk among the risks corresponding to each of the plurality of paths for each situation; and control the plurality of control modules based on a command set corresponding to the safety path.

The central controller may be configured to determine a stop request time of the vehicle based on the speed of the vehicle, to determine an accident probability of the vehicle corresponding to each of the paths based on the speed of the vehicle and the stop request time, and to determine the risk based on the accident probability.

The central controller may be configured to determine a fatal degree of the vehicle based on a predetermined mass of the vehicle and a speed of the vehicle, and to determining the risk based on the fatal degree.

Based on a failure of the central processor, the central controller may be configured to control the plurality of control modules based on the command set corresponding to the safety path of a previous time.

The control module may be configured to: based on the failure of the central processor, change the command set corresponding to the safety path by performing communication between the plurality of control modules, and control the vehicle based on the changed command set.

Based on a case in which a communication failure occurs in at least one control module between or among the plurality of control modules, the plurality of control modules may be configured to control the control module in which the communication failure occurred based on the command set corresponding to the safety path of the previous time.

The central controller may be configured to identify whether the control module where the communication failure occurred follows a previous command with vehicle position information and may be configured to update the command set corresponding to the safety path to the plurality of control modules except for the control module in which the failure occurs according to the result.

The central controller may be configured to control the vehicle to drive in the safety path corresponding to the smallest risk by controlling the plurality of control modules except for the control module in which the failure occurs.

BRIEF DESCRIPTION OF THE DRAWINGS

These and/or other aspects of the disclosure should become apparent and more readily appreciated from the following description of the embodiments, taken in conjunction with the accompanying drawings of which:

FIG. 11 is a flowchart according to an embodiment.

DETAILED DESCRIPTION

Figure 1:
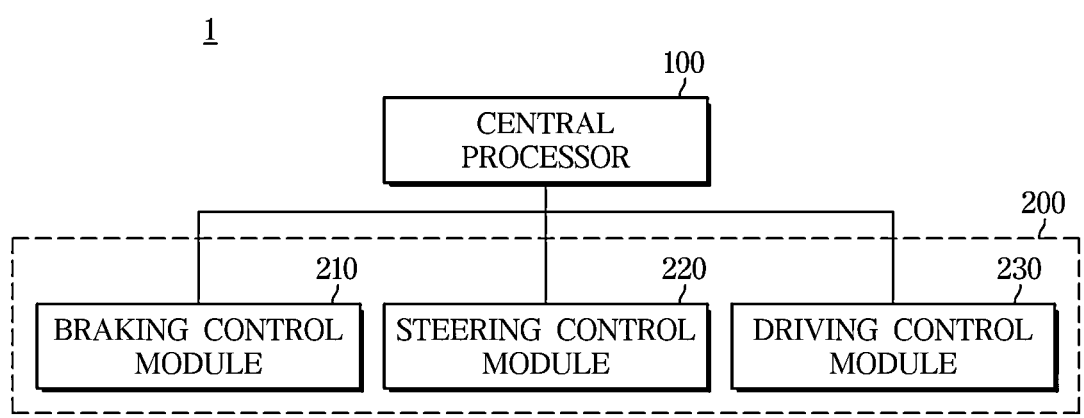
FIG. 1 is a control block diagram of a vehicle according to an embodiment.

Like reference numerals refer to like elements throughout the specification. Not all elements of the embodiments of the disclosure are described, and the description of what is commonly known in the art or what overlaps with each other in the embodiments have been omitted. The terms as used throughout the specification, such as "~ part," "~ module," "~ member," "~ block," etc., may be implemented in software and/or hardware, and a plurality of "~ parts," "~ modules," "~ members," or "~ blocks" may be implemented in a single element, or a single "~ part," "~ module," "~ member," or "~ block" may include a plurality of elements.

It should be further understood that the term "connect" and its derivatives refer both to direct and indirect connection, and the indirect connection includes a connection over a wireless communication network.

The terms "include (or including)" and "comprise (or comprising)" are inclusive or open-ended and do not exclude additional, unrecited elements or method steps, unless otherwise mentioned.

Further, when it is stated that a layer is "on" another layer or substrate, the layer may be directly on another layer or substrate or a third layer may be disposed therebetween.

It should be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section.

It should be understood that the singular forms "a," "an," and "the" include plural references unless the context clearly dictates otherwise.

Reference numerals used for method steps are merely used for convenience of explanation and are not intended to limit an order of the steps. Thus, unless the context clearly dictates otherwise, the written order may be practiced otherwise. When a component, device, element, or the like of the present disclosure is described as having a purpose or performing an operation, function, or the like, the component, device, or element should be considered herein as being "configured to" meet that purpose or to perform that operation or function.

Hereinafter, an operation principle and embodiments of the disclosure are described with reference to accompanying drawings.

FIG. 1 is a control block diagram of a vehicle according to an embodiment.

Referring to FIG. 1, a vehicle 1 may include a central processor 100 and a plurality of control modules 200.

The plurality of control modules 200 may include a braking control module 210 for controlling deceleration of the vehicle 1, a steering control module 220 for determining a driving direction of the vehicle 1, and a driving control module 230 for controlling a speed of the vehicle 1.

Meanwhile, the central processor 100 may be provided as a vehicle computer (vc) in charge of determination and control.

Meanwhile, the control module 200 may be provided as a smart actuator (sa).

When an emergency situation occurs, the central processor 100 may determine a plurality of paths for each situation based on the speed of the vehicle 1.

The emergency situation may refer to a situation in which it is difficult for the vehicle 1 to perform normal autonomous driving, such as when a breakdown occurs in the vehicle 1.

The plurality of paths for each situation may refer to a predetermined driving scenario in the emergency situation, and the path may refer to a driving path of the vehicle 1 accordingly.

The central processor 100 may determine a risk corresponding to each of the plurality of paths for each situation based on the speed of the vehicle 1 and a mass of the vehicle 1.

According to an embodiment, the risk may be determined as a product of a probability of occurrence of an accident of the vehicle 1 and a fatal degree, and the fatal degree may be determined based on the mass and the speed of the vehicle 1.

The central processor 100 may determine a safety path corresponding to the smallest risk among risks corresponding to each of a plurality of paths for each situation.

In other words, the central processor 100 may determine the risk for each driving path and determine that the vehicle 1 drives on a path having the smallest risk.

The central processor 100 may control the plurality of control modules 200 based on a command set corresponding to the safety path.

In other words, the central processor 100 may match and store a command for controlling the control module 200 corresponding to each scenario.

Therefore, when the safety path with the smallest risk is determined, the control module 200 may be controlled using the command corresponding to the path.

The central processor 100 may determine a stop request time of the vehicle 1 based on the speed of the vehicle 1.

The stop request time may refer to a time taken to stop when the vehicle 1 drives at a current speed.

The central processor 100 may determine an accident probability of the vehicle 1 corresponding to each of the paths based on the speed of the vehicle 1 and the stop request time.

The accident probability of the vehicle 1 may refer to a probability that the accident such as the vehicle 1 collides with another vehicle in the emergency situation may occur.

Further, the central processor 100 may determine the risk based on the accident probability.

Meanwhile, the central processor 100 may determine the fatal degree of the vehicle 1 based on a predetermined mass of the vehicle 1 and the speed of the vehicle 1.

The fatal degree may refer to an amount of impact determined by a change in speed and the mass of the vehicle 1, which is described in detail below.

The central processor 100 may determine the risk based on the fatal degree.

When a failure occurs in the central processor 100, the central processor 100 may control the plurality of control modules 200 based on the command set corresponding to the safety path at a previous time.

In other words, even if the failure occurs in each control module 200, each control module 200 may recognize the command set at the time before the failure occurs. Each control module 200 may control each control module 200 based on the command at the previous time rather than a current time.

Meanwhile, the central processor 100 may change the command set corresponding to the safety path by performing communication between the plurality of control modules 200 when the failure occurs in the central processor 100.

The control module 200 may control the vehicle 1 based on the changed command set.

When a communication failure occurs in at least one control module between or among the plurality of control modules 200, the plurality of control modules 200 may control the control module in which the communication failure occurs based on the command set corresponding to the safety path of the previous time.

Each control module 200 may also control each control module 200 based on the command from the previous time rather than the current time, when the communication failure occurs.

At this time, it is identified with vehicle position information, etc. whether each control module 200 is controlling according to the command at the previous time, and depending on whether a previous command is followed, the central processor 100 may update the command set corresponding to the safety path to the plurality of control modules 200 except for the control module 200 in which the failure occurs.

In other words, the central processor 100 may continuously update the command according to the path in response to the control module 200 in which the failure does not occur.

The central processor 100 may control the plurality of control modules 200 except for the faulty control module to control the vehicle 1 to drive on the safety path corresponding to the smallest risk.

In other words, when there is the control module in which the failure occurs between or among the plurality of control modules 200, the central processor 100 may control the vehicle 1 to drive on the driving path with the smallest risk with the control module excluding the control module in which the failure occurs.

The present disclosure relates to a technology related to an autonomous vehicle without a brake, a steering wheel, or an accelerator pedal that allow the driver to intervene and control the vehicle 1 in the emergency situation.

On the other hand, when a problem in a high-speed communication network (e.g., Ethernet) used for communication between the central processor 100 and the control module 200 occurs based on the above-described operation, the vehicle 1 may transition to a safe state in a situation where the vehicle 1 may be in serious danger.

The central processor 100 may calculate braking, steering, and driving commands required for autonomous driving and transmit them to each control module using a high-speed communication. Each control module may control the vehicle 1 by transmitting the received driving command to a driving device that actually drives.

In addition, when a problem occurs in the communication network of the vehicle 1, the central processor 100 cannot control configurations of the vehicle 1, so a possibility of an accident may be very high.

In order to solve the problem, the safety path is determined in case a control command cannot be transmitted due to a problem in the communication network. By calculating a command group (time series command group) of each control module required to drive the path, it may be transmitted at the same time as a current command is transmitted.

The central processor 100 and the control module 200 may include a memory that stores data for an algorithm or a program that reproduces the algorithm for controlling the operation of components in the vehicle 1. The central processor 100 and the control module 200 may also a processor that performs the above-described operation using the data stored in the memory. In this case, the memory and the processor may be implemented as separate chips. Alternatively, the memory and the processor may be implemented as a single chip.

At least one component may be added or deleted according to the performance of the components of the vehicle 1 illustrated in FIG. 1. In addition, it should be readily understood by those of ordinary skill in the art that the mutual positions of the components may be changed corresponding to the performance or structure of the system.

Meanwhile, each component illustrated in FIG. 1 may refer to software and/or hardware components such as Field Programmable Gate Array (FPGA) and Application Specific Integrated Circuit (ASIC).

Figure 2:
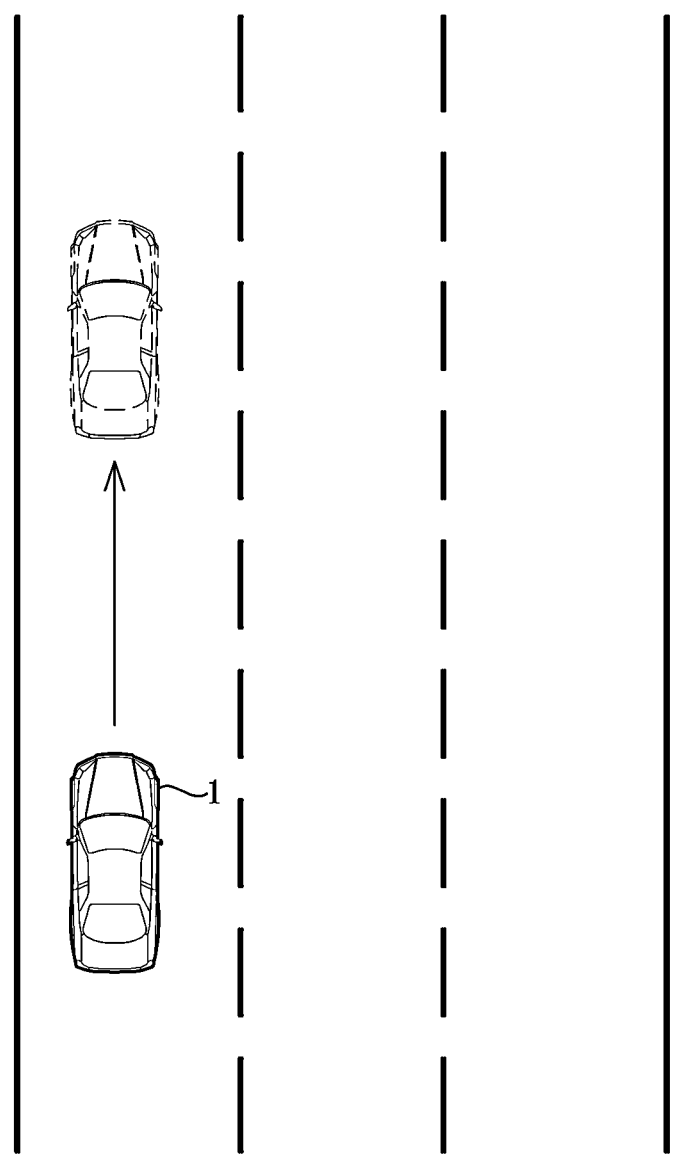
FIGS. 2-4 are views for describing an operation of determining a path for each situation according to an embodiment.
Figure 3:
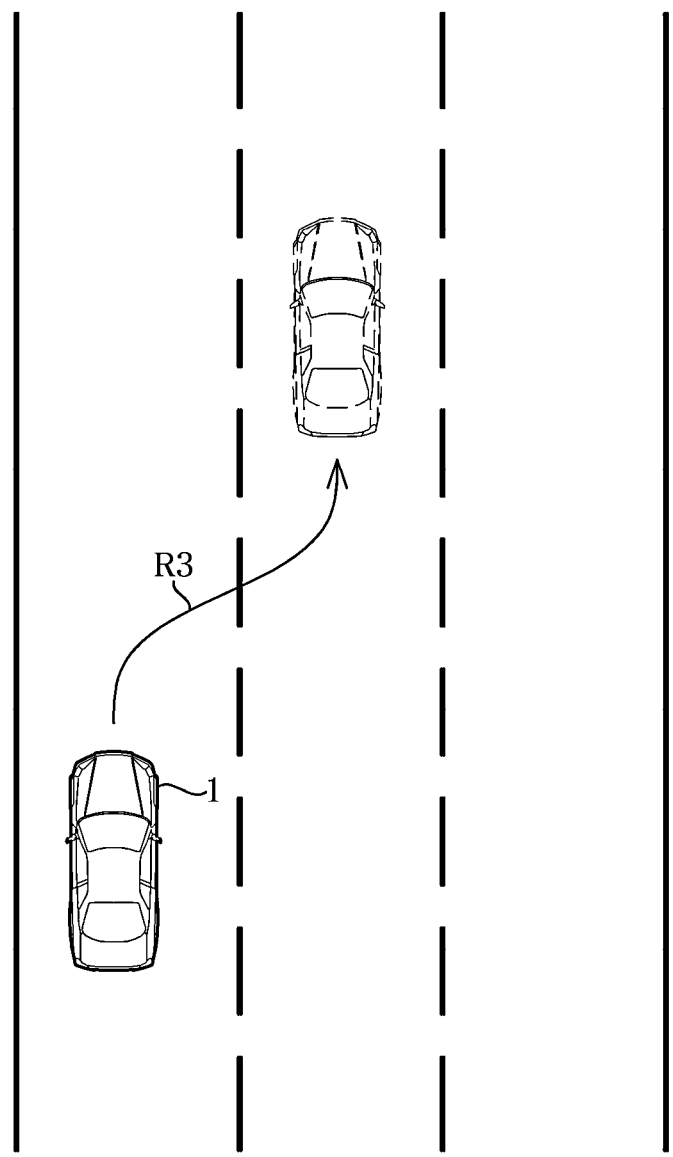
Figure 4:
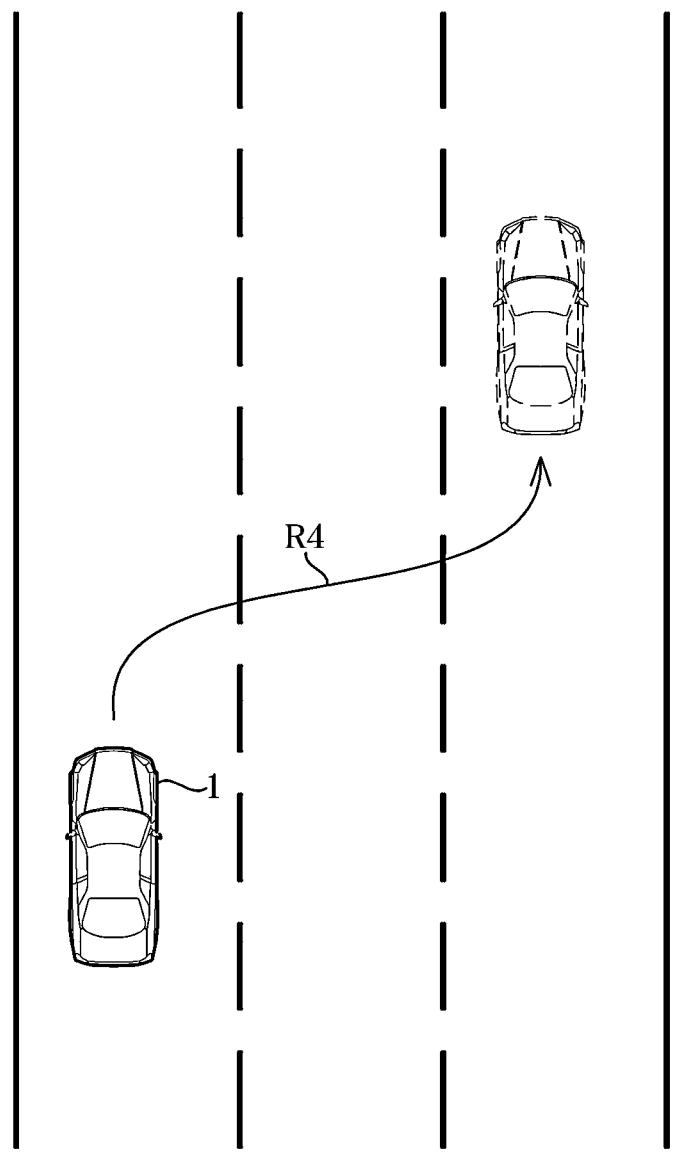

FIGS. 2-4 are views for describing an operation of determining a path for each situation according to an embodiment.

The central processor 100 may determine the path for each situation in a driving situation.

According to the embodiment of the disclosure, the situation may include a stop on a driving lane illustrated in FIG. 2, a stop on an adjacent lane illustrated in FIG. 3, and a stop on a hard shoulder or the outermost lane illustrated in FIG. 4.

The central processor 100 may determine a path required until stopping according to three driving situations.

Particularly, the central processor 100 may determine a braking distance when the brake is applied.

The braking distance may be determined based on Equation 1 below.

$$d = \frac{v^2}{2g\mu} \qquad \text{[Equation 1]}$$

Referring to Equation 1, d may refer to the braking distance, v may refer to a vehicle speed, g may refer to a gravitational acceleration, and μ may refer to a friction coefficient of a road.

On the other hand, the central processor 100 may determine a stopping distance of the path in FIG. 2 as "2×d" in order to calculate the path to the stop for each situation, determine the stopping distance as "2.5×d" in FIG. 3, and determine the stopping distance as "3×d" in FIG. 4.

In addition, the central processor 100 may determine the path in consideration of the inter-vehicle movement based on the stopping distance of each situation.

Particularly, in the case of FIG. 2, a path in which the vehicle 1 stops on the same lane may be determined.

In addition, in the case of FIG. 3, the central processor 100 may determine a path in which the vehicle 10 moves to a lane immediately adjacent to it and stops.

In the case of FIG. 4, the central processor 100 may determine a path in which the vehicle 10 stops at the maximum on the shoulder.

The central processor 100 may determine the path having the least risk among each path based on an operation to be described below and control each control module based on the command set corresponding to the path.

Meanwhile, the driving scenario of the vehicle 1 described with reference to FIGS. 2-4 is only one embodiment of the disclosure, and there is no limitation on the driving situation and the driving path of the vehicle 1 in the emergency situation.

Figure 5:
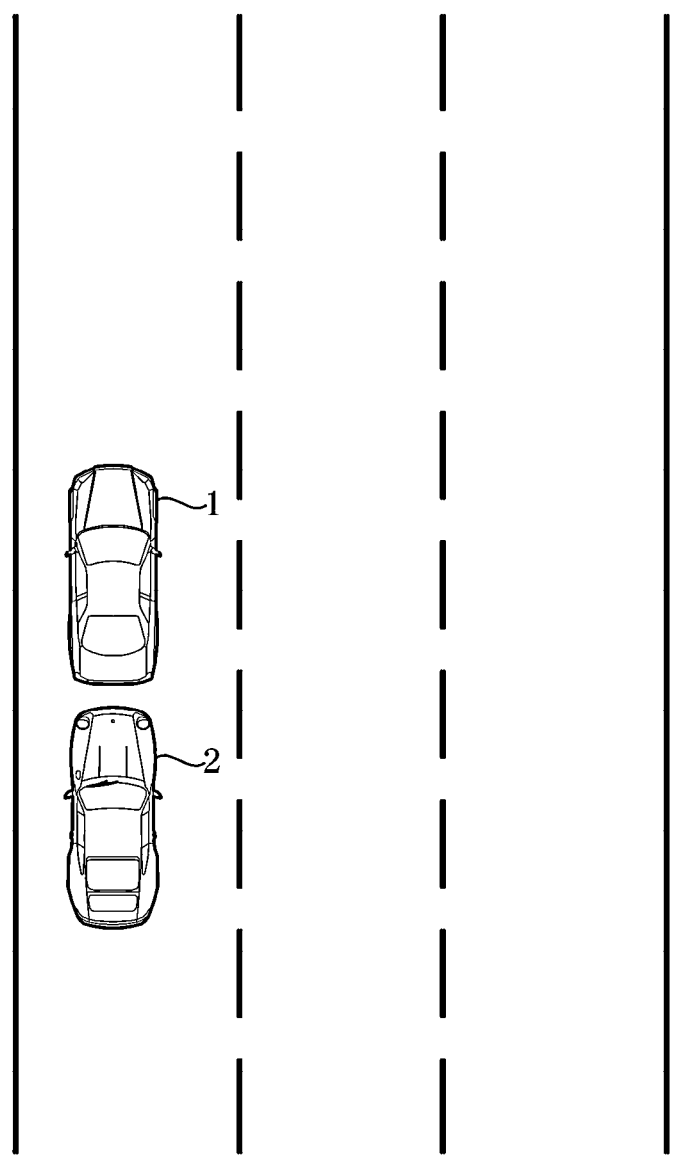
FIGS. 5 and 6 are views for describing an operation of determining an accident probability according to an embodiment.
Figure 6:
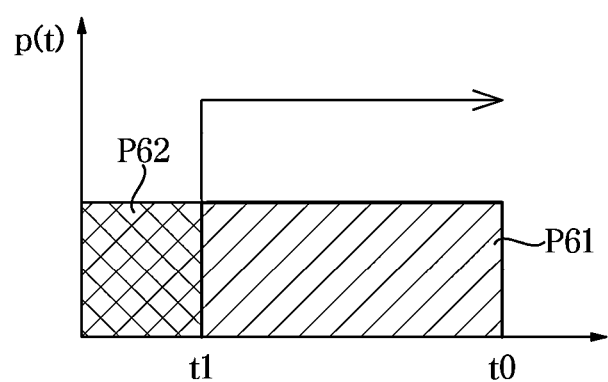

FIGS. 5 and 6 are views for describing an operation of determining an accident probability according to an embodiment.

Referring to FIGS. 5 and 6, the central processor 100 may determine the stop request time of the vehicle 1 based on the speed of the vehicle 1.

The stop request time of the vehicle 1 may refer to a time required for the vehicle 1 to be completely stopped in a state in which the vehicle 1 is driving at the current speed and may be determined by Equation 2 below.

$$t_0 = \frac{V_0}{\mu \times g} \quad \text{[Equation 2]}$$

Referring to Equation 2, $t_0$ may refer to the stop request time, $V_0$ may refer to the current speed of the vehicle 1, and u may refer to a friction coefficient.

Meanwhile, the accident probability may be determined based on a density function using the time determined by the above method as a variable.

Particularly, referring to FIG. 6, the density function for determining the accident probability is illustrated.

Particularly, the density function of accident probability p(t) may be expressed as follows.

$$1 = \int_0^{t_0} p(t) \quad \text{[Equation 3]}$$

Referring to Equation 3, p(t) may refer to a probability density function for calculating the accident probability of the vehicle 1. When an integration from 0 to $t_0$ is performed, a probability 1 may be calculated.

Meanwhile, the accident probability according to the path of the driving situation may be calculated based on the following equation.

$$P(t_1) = \int_{t_0}^{t_0} p(t) \quad \text{[Equation 4]}$$

Referring to Equation 4, as for a total probability density function, $t_1$ may refer to a time during which a collision may occur when a path of a specific situation is driven.

In addition, $P(t_1)$ may refer to a probability of occurrence of the accident corresponding to $t_1$.

In other words, from a point in time when a trajectory of each scenario is calculated on the path of the specific situation to a time $t_1$ when a collision with another vehicle occurs, the probability of the accident in the scenario may refer to a value obtained by integrating $P(t_1)$ from $t_1$ to $t_0$.

In other words, in FIG. 6, the corresponding value may be determined as P61. In FIG. 6, when the stop request time of a host vehicle is t0 and a collision time with another vehicle is $t_1$, the central processor 100 may determine the accident probability as P61 based on the stop request time.

In FIG. 6, a sum of P61 and P62 may be determined to be 1.

The central processor 100 may determine the accident probability of the vehicle 1 corresponding to each of the paths based on the speed of the vehicle 1 and the stop request time and determine the risk using the accident probability based on a method to be described below.

Meanwhile, the operation of determining the accident probability disclosed in FIGS. 5 and 6 is only an embodiment of the disclosure, and the operation of calculating the accident probability is not limited thereto.

Figure 7:
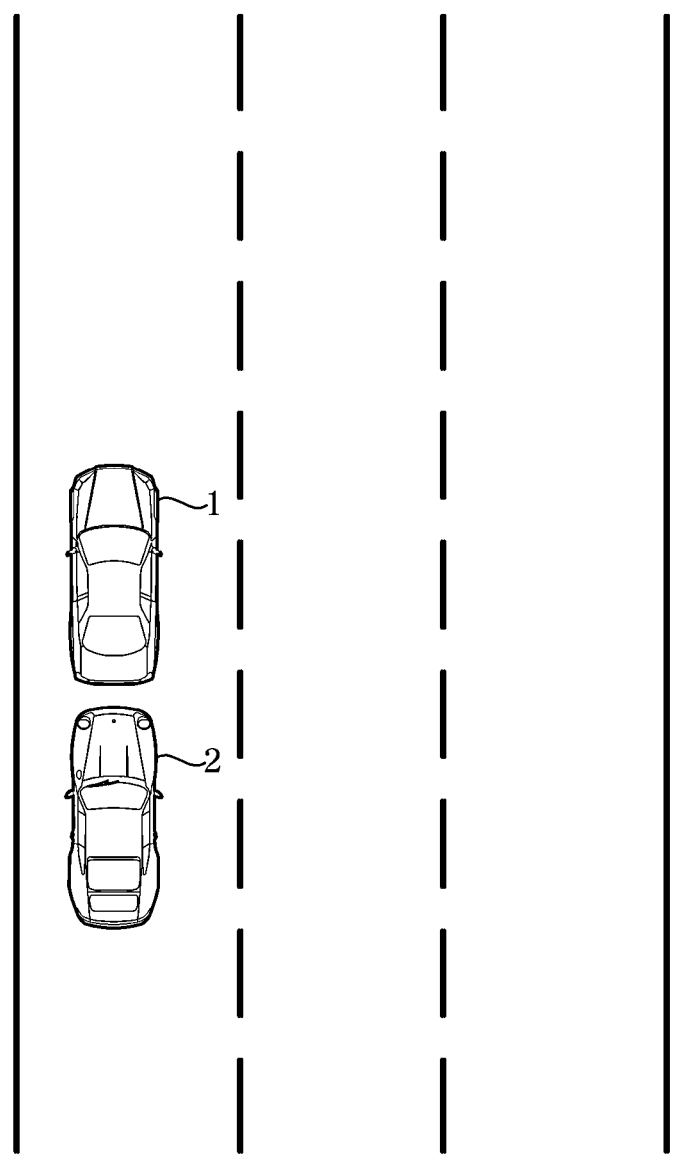
FIG. 7 is a view for describing an operation of calculating a fatal degree according to an embodiment.

FIG. 7 is a view for describing an operation of calculating a fatal degree according to an embodiment.

Referring to FIG. 7, the vehicle 1 and the other vehicle 2 are driving.

Particularly, the central processor may determine 100 the fatal degree of the vehicle 1 based on the predetermined mass of the vehicle 1 and the speed of the vehicle 1 and determine the risk based on the fatal degree.

On the other hand, the fatal degree may be calculated based on the amount of impact of the vehicle 1.

A mass and speed of the other vehicle 2 necessary for calculating the amount of impact of the vehicle 1 may be obtained through a vision sensor or a radar sensor provided in the vehicle 1.

Particularly, when an impact force generated when the vehicle 1 collides with the other vehicle 2 is F, an impact time is dt, the mass of the vehicle 1 is m, the vehicle speed before the collision is $V_0$, and the vehicle speed after the collision is $V_1$, the amount of impact may be calculated based on the following equation.

$$I = Fdt = m \times (V_0 - V_1) \quad \text{[Equation 5]}$$

Based on Equation 5, the central processor 100 may calculate the vehicle speed after the collision using a momentum conservation law and the speed and mass of the other vehicle 2 obtained by the sensor.

The central processor 100 may determine the fatal degree in this way.

In addition, the central processor 100 may calculate the risk using the accident probability and the fatal degree obtained by the above method.

The risk may be determined as the product of the accident probability and the fatal degree described above.

Particularly, the risk according to the path for each situation may be determined based on the following equation.

$$R(n) = P(n) \times I(n) \quad \text{[Equation 6]}$$

Referring to Equation 6, R may refer to the risk of the path for each situation, P may refer to the accident probability of the corresponding path, and I may refer to the fatal degree of the corresponding path.

Particularly, if the risk of the path for each situation is R(1), it may be determined as R(1)=P(1)×I(1).

On the other hand, based on these calculations, the central processor 100 may determine the path with the smallest risk value by comparing the risk of each path, R(1), R(2), and R(3) for each situation.

The central processor 100 may determine this path as the safety path.

For example, the central processor 100 may select path1 as the safety path if the value of R(1) is the smallest in the above description.

Meanwhile, the central processor 100 may determine the command set for each control module to drive the selected path.

The central processor 100 may generate a steering command to be executed in the steering control module 220 until a stop point and may generate the command group that controls the braking and drive control modules 210 and 230 in the same way and transmit it to each control module.

In addition, the central processor 100 may transmit the command group that is generated in this way for each control module while actually transmitting the command to drive the control module 200.

Meanwhile, the operation described with reference to FIG. 7 is merely an embodiment of the disclosure, and there is no limitation on the operation of determining the fatal degree and the risk.

Figure 8:
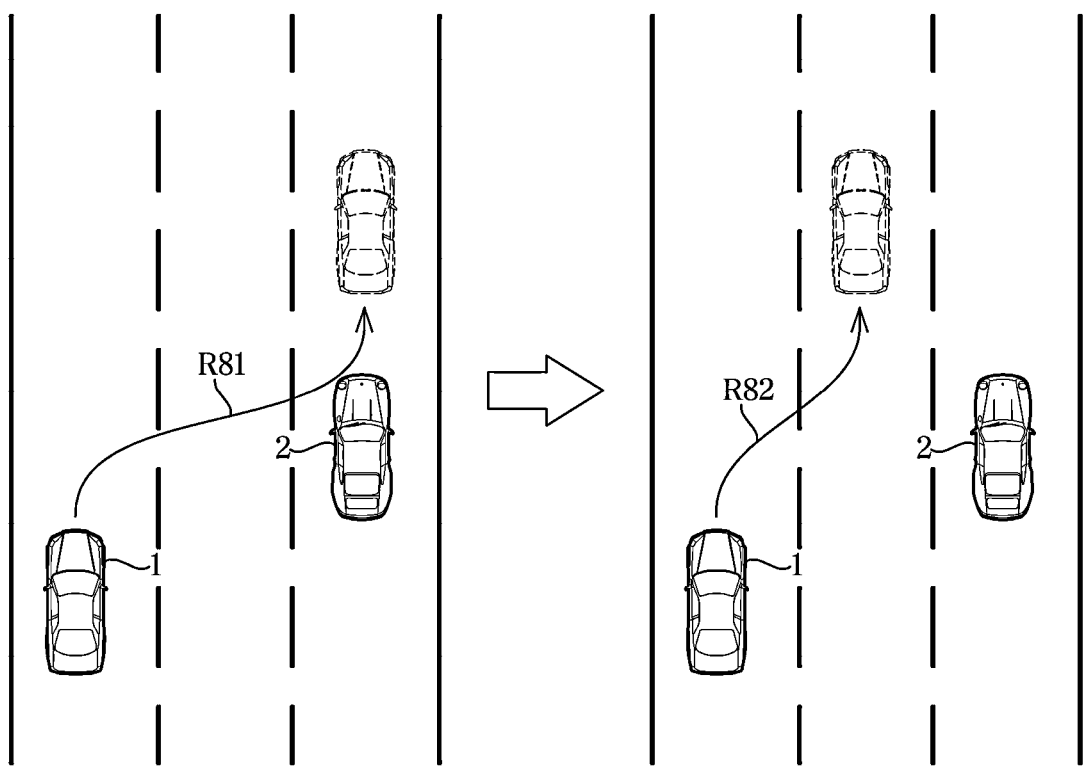
FIGS. 8-10 are views for describing an operation of changing a path for each situation of a vehicle according to an embodiment.
Figure 9:
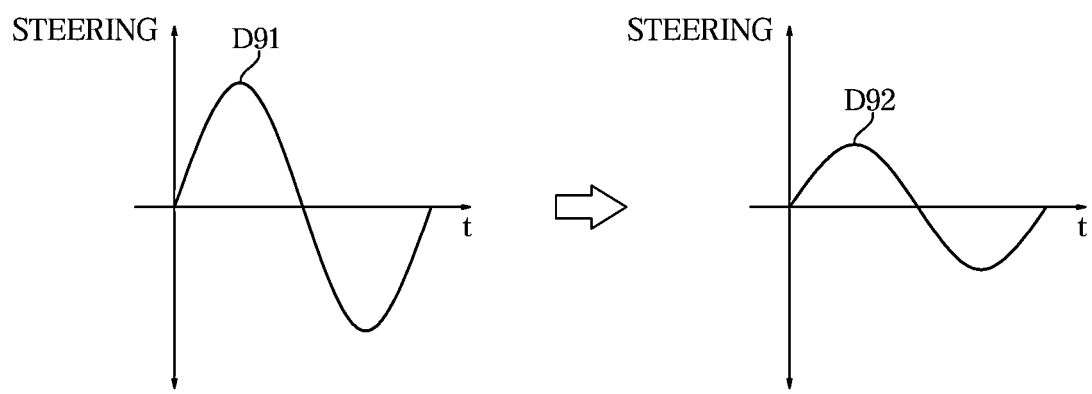
Figure 10:
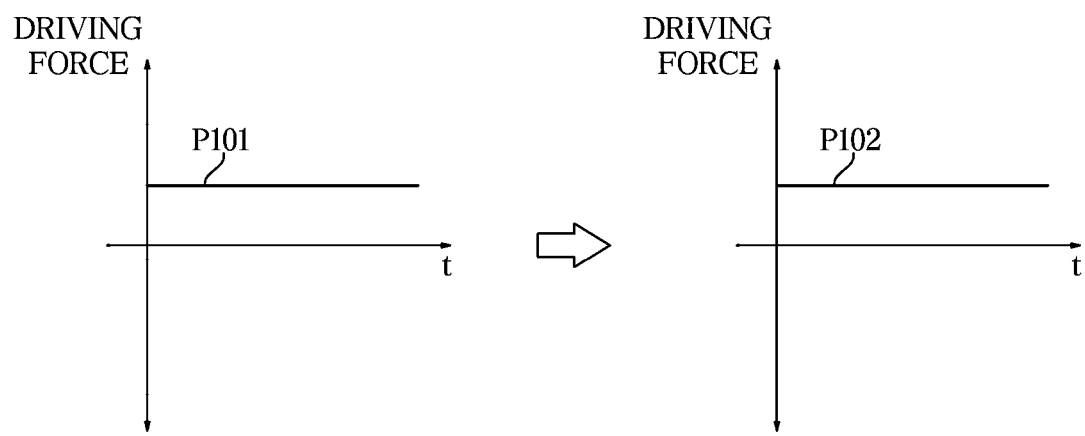

FIGS. 8-10 are views for describing an operation of changing a path for each situation of a vehicle according to an embodiment.

Referring to FIGS. 1 and 8 together, when the failure occurs in the central processor 100, the central processor 100 may control the plurality of control modules 200 based on the command set corresponding to the safety path of the previous time.

On the other hand, when the failure occurs in the central processor 100, the control module 200 provided in the vehicle 1 may perform communication between the plurality of control modules 200 to change the command set corresponding to the safety path and may control the vehicle 1 based on the changed command set.

When the communication with each control module 200 is not possible due to the failure in the central processor 100, the control module 200 may control the drive configuration by executing the previously transmitted command set because the communication is not normal.

Also, when a communication state of the central processor 100 fails, the command set of a drive configuration control may be modified by communicating with the remaining control modules.

In addition, when the communication failure occurs in at least one control module between or among the plurality of control modules 200, the plurality of control modules 200 may control the control module in which the communication failure occurs based on the command set corresponding to the safety path of the previous time.

In other words, the control module 200 may perform control by executing the command group in the previously received method.

It is assumed that the control module 200 with normal communication and the central processor 100 continuously communicate while the control module whose communication is cut off performs the previously transmitted command group, and the path may be generated for each situation.

It is possible to identify whether the control module, whose communication has been cut off, is controlling according to the command of the previous time, using the vehicle position information, etc., and whether the ECU has failed depending on whether the previous command is followed.

The central processor 100 may update the command set corresponding to the safety path to the plurality of control modules 200 except for the control module in which the failure has occurred.

The central processor 100 may control the plurality of control modules 200 except for the control module in which the failure has occurred to control the vehicle 1 to drive in the safety path corresponding to the smallest risk.

Particularly, each of the plurality of control modules 200 may identify whether the drive control module, whose communication has been cut off, follows the previously transmitted command group with the vehicle location information, etc. and may control the control module in which the communication is normal on a trajectory where the risk is minimized by calculating the risk when the previous command is followed.

In addition, the control module 200 may continuously transmit the command group to other control modules that communicate normally in case communication is interrupted.

On the other hand, if the control module, whose communication is cut off, does not follow the previous command, the control module itself has failed. In this case, the vehicle 1 may be controlled by determining the path that minimizes the risk with only the remaining control modules.

In other words, referring to FIG. 8, although the vehicle 1 was driving along a R81 path, the failure of the central processor 100 or each control module occurred, indicating that the driving path was changed to R82 in the emergency situation.

In other words, the vehicle 1 may change the driving path to R82 when the failure occurs in the control module or the central processor 100 while driving with R81 in the emergency state and may control the central processor 100 and each control module based on the command set corresponding to a R82 path in the command set corresponding to the R81 path.

In this case, referring to FIGS. 8 and 9 together, in the case of R81, a steering angle has a large deviation as D91, but the deviation may decrease as in D92 while changing the path to R82.

Also, in this case, referring to FIGS. 8 and 10, a driving force may be constantly maintained at P101 and P102.

In other words, the central processor 100 and the control module 200 may change the path by differently controlling each control module according to the failure and may control the vehicle 1 based on the command set corresponding to the changed path.

Meanwhile, the operation of changing the path described in FIGS. 8-10 and changing the steering and the driving force according to a change of the path is only the embodiment of the disclosure, and there is no limitation on the change of vehicle control according to the change of the path.

FIG. 11 is a flowchart according to an embodiment.

Referring to FIG. 11, when the emergency situation occurs in the vehicle 1 (YES in 1001), the central processor 100 may determine a path for each situation (1002).

Meanwhile, the central processor 100 may determine the accident probability of the vehicle 1 for each path (1003).

In addition, the central processor 100 may calculate the fatal degree determined by the amount of impact of the vehicle 1 for each path (1004).

Also, the central processor 100 may determine the risk for each path by using the accident probability and the fatal degree (1005).

The central processor 100 may determine the path having the smallest risk among the risks determined by the above-described operation as the safety path (1006).

The central processor 100 may control the vehicle 1 based on the command set corresponding to this path (1007).

According to the embodiments of the disclosure, the vehicle may perform safe autonomous driving without user intervention through the operation of the control module and communication between the control modules even in the emergency situation of the autonomous vehicle.

The disclosed embodiments may be implemented in the form of a recording medium storing computer-executable instructions that are executable by a processor. The instructions may be stored in the form of a program code, and when executed by a processor, the instructions may generate a program module to perform operations of the disclosed embodiments. The recording medium may be implemented non-transitory as a non-transitory computer-readable recording medium.

The non-transitory computer-readable recording medium may include all types of recording media storing commands that may be interpreted by a computer. For example, the non-transitory computer-readable recording medium may be, for example, ROM, RAM, a magnetic tape, a magnetic disc, flash memory, an optical data storage device, and the like.

Embodiments of the disclosure have thus far been described with reference to the accompanying drawings. It should be apparent to those of ordinary skill in the art that the disclosure may be practiced in other forms than the embodiments as described above without changing the technical idea or essential features of the disclosure. The above embodiments are only by way of example and should not be interpreted in a limited sense.

What is claimed is:

1. A vehicle comprising:
a plurality of control modules including a braking control module configured to control deceleration of the vehicle, a steering control module configured to control a driving direction of the vehicle, and a driving control module configured to control a speed of the vehicle; and a central processor configured to
- in response to at least one control module of the plurality of control modules being in a communication failure state, determine a plurality of paths for each situation based on a speed of the vehicle,
- determine a risk corresponding to each path of the plurality of paths for each situation based on the speed of the vehicle and a mass of the vehicle,
- determine a safety path corresponding to a smallest risk among the risks corresponding to each path for each situation, and
- transmit commands corresponding to the safety path to remaining control modules of the plurality of control modules, wherein, in response to the at least one control module being in the communication failure state,
- the at least one control module is configured to perform control of the vehicle based on the command received from the central processor prior the communication failure state of the at least one control module, and
- the remaining control modules are configured to perform control of the vehicle based on the commands received from the central processor, and wherein the central processor is configured to, when the at least one control module does not perform the control based on the command received from the central processor prior to the communication failure state of the at least one control module, determine the safety path using the remaining control modules.

2. The vehicle according to claim 1, wherein the central processor is configured to:
- determine a stop request time of the vehicle based on the speed of the vehicle,
- determine an accident probability of the vehicle corresponding to each of the paths based on the speed of the vehicle and the stop request time, and
- determine the risk based on the accident probability.

3. The vehicle according to claim 1, wherein the central processor is configured to:
- determine a fatal degree of the vehicle based on a predetermined mass of the vehicle and a speed of the vehicle, and
- determine the risk based on the fatal degree.

4. The vehicle according to claim 1, wherein, in response to the central processor being in a failure state, the plurality of control modules are configured to:
- perform control based on the commands received from the central processor prior to the failure state of the central processor,
- change the commands received from the central processor prior to the failure state of the central processor by communicating with each other, and
- control an autonomous driving based on the changed commands.

5. The vehicle according to claim 1, wherein the central processor is configured to:
- identify whether the at least one of control module is performing the control based on the command received from the central processor prior the communication failure state of the at least one of control module based on vehicle position information, and
- when the at least one control module performs the control based on the command received from the central processor prior the communication failure state of the at least one control module, determine the safety path using the at least one control module and the remaining control modules.

6. The vehicle according to claim 5, wherein the central processor is configured to:
- when the at least one control module performs the control based on the command received from the central processor prior the communication failure state of the at least one control module, determine the safety path using the at least one control module and the remaining control modules; and
- update the commands corresponding to the safety path of the remaining control modules.

* * * * *